United States Patent
Furuta et al.

(10) Patent No.: US 7,487,798 B2
(45) Date of Patent: Feb. 10, 2009

(54) LINEAR SOLENOID VALVE

(75) Inventors: Hideki Furuta, Kakuda (JP); Shigeto Ryuen, Sendai (JP); Hidetoshi Watanabe, Shibata-gun (JP); Satoshi Noda, Sendai (JP); Masahiro Watanabe, Kakuda (JP)

(73) Assignee: Keihin Corporation, Tokyo (JP)

( * ) Notice: Subject to any disclaimer, the term of this patent is extended or adjusted under 35 U.S.C. 154(b) by 253 days.

(21) Appl. No.: 11/090,349

(22) Filed: Mar. 24, 2005

(65) Prior Publication Data

US 2005/0218363 A1    Oct. 6, 2005

(30) Foreign Application Priority Data

Mar. 31, 2004    (JP)    ............... 2004-103458

(51) Int. Cl.
*F16K 31/02*    (2006.01)

(52) U.S. Cl. ............... 137/625.65; 251/129.15; 335/262; 335/267; 335/299

(58) Field of Classification Search ............ 251/129.15, 251/129.02; 335/262, 297, 299; 137/625.65
See application file for complete search history.

(56) References Cited

U.S. PATENT DOCUMENTS

| | | | |
|---|---|---|---|
| 2,239,312 A | 4/1941 | Berges | |
| 3,417,593 A | 12/1968 | Lewis | |
| 3,538,954 A * | 11/1970 | Bowsher et al. | 137/625.65 |
| 3,670,768 A | 6/1972 | Griswold | |
| 3,791,408 A * | 2/1974 | Saitou et al. | 137/529 |
| 3,817,491 A | 6/1974 | Burckhardt et al. | |
| 4,250,922 A | 2/1981 | Will et al. | |
| 4,278,959 A * | 7/1981 | Nishimiya et al. | 335/262 |
| 4,553,735 A | 11/1985 | Brundage | |
| 4,611,632 A | 9/1986 | Kolchinsky et al. | |
| 4,750,704 A | 6/1988 | Brundage | |
| 4,791,958 A | 12/1988 | Brundage | |
| 4,836,248 A * | 6/1989 | Stegmeier | 137/625.65 |
| 4,855,702 A * | 8/1989 | Swanson et al. | 335/262 |
| 4,919,390 A | 4/1990 | Ichiryu et al. | |
| 4,944,328 A | 7/1990 | Brundage | |
| 4,947,893 A * | 8/1990 | Miller et al. | 137/625.65 |
| 5,445,189 A | 8/1995 | Yamamuro | |
| 5,467,961 A * | 11/1995 | Sausner et al. | 251/129.15 |
| 5,476,313 A | 12/1995 | Lauer | |

(Continued)

FOREIGN PATENT DOCUMENTS

JP    56-23719    3/1981

(Continued)

OTHER PUBLICATIONS

Japanese Office Action for Application No. 2004-100955, dated Oct. 9, 2007.

(Continued)

*Primary Examiner*—John Bastianelli
(74) *Attorney, Agent, or Firm*—Lahive & Cockfield, LLP; Anthony A. Laurentano, Esq.

(57) ABSTRACT

A bottom of a housing has a protruding support extending a predetermined distance toward a movable core, and the movable core has an annular boss extending a predetermined distance toward the housing. The annular boss is disposed in an annular space defined between the bottom of the housing and the protruding support of the housing.

14 Claims, 13 Drawing Sheets

U.S. PATENT DOCUMENTS

| | | | |
|---|---|---|---|
| 5,518,219 A | 5/1996 | Wenzel et al. | |
| 5,565,832 A * | 10/1996 | Haller et al. | 335/249 |
| 5,707,039 A * | 1/1998 | Hamilton et al. | 251/129.17 |
| 5,746,412 A | 5/1998 | Niimi | |
| 5,775,670 A | 7/1998 | Osterbrink | |
| 5,853,028 A * | 12/1998 | Ness et al. | 137/625.65 |
| 5,856,771 A * | 1/1999 | Nippert | 335/262 |
| 5,865,907 A | 2/1999 | Katayama et al. | |
| 5,899,436 A * | 5/1999 | Holmes et al. | 251/129.15 |
| 5,992,822 A * | 11/1999 | Nakao et al. | 251/129.15 |
| 6,029,703 A * | 2/2000 | Erickson et al. | 251/129.15 |
| 6,089,467 A * | 7/2000 | Fochtman et al. | 251/129.15 |
| 6,142,445 A * | 11/2000 | Kawaguchi et al. | 251/129.15 |
| 6,187,459 B1 | 2/2001 | Katayama et al. | |
| 6,220,275 B1 | 4/2001 | Nishinosono et al. | |
| 6,225,886 B1 * | 5/2001 | Kleinert et al. | 335/262 |
| 6,269,827 B1 * | 8/2001 | Potter | 137/625.65 |
| 6,386,220 B1 * | 5/2002 | Koenings | 137/625.65 |
| 6,390,443 B1 | 5/2002 | Katayama et al. | |
| 6,530,528 B2 * | 3/2003 | Breyer et al. | 251/129.15 |
| 6,578,606 B2 * | 6/2003 | Neuhaus et al. | 137/625.65 |
| 6,621,190 B1 | 9/2003 | Asao et al. | |
| 6,644,622 B2 | 11/2003 | Modien et al. | |
| 6,688,334 B2 | 2/2004 | Kawamura et al. | |
| 6,799,746 B2 | 10/2004 | Schafer et al. | |
| 6,918,570 B2 | 7/2005 | Ahn | |
| 2002/0101314 A1 | 8/2002 | Oishi et al. | |
| 2002/0113677 A1 | 8/2002 | Holmes et al. | |
| 2002/0145125 A1 * | 10/2002 | Tomoda et al. | 251/129.15 |
| 2002/0179874 A1 * | 12/2002 | Hofmann et al. | 251/129.15 |
| 2003/0184422 A1 | 10/2003 | Matsusaka et al. | |
| 2005/0184841 A1 | 8/2005 | Ryuen et al. | |
| 2005/0211938 A1 | 9/2005 | Ryuen et al. | |
| 2005/0218362 A1 | 10/2005 | Furuta et al. | |

FOREIGN PATENT DOCUMENTS

| | | |
|---|---|---|
| JP | 61-112608 | 7/1986 |
| JP | 62-136807 | 6/1987 |
| JP | 63-56371 | 4/1988 |
| JP | 64-51765 | 3/1989 |
| JP | 4-350331 | 12/1992 |
| JP | 5-11410 | 2/1993 |
| JP | 6-244023 | 9/1994 |
| JP | 06-302237 | 10/1994 |
| JP | 07-011397 | 1/1995 |
| JP | 7-302709 | 11/1995 |
| JP | 8-288134 | 11/1996 |
| JP | 8-306527 | 11/1996 |
| JP | 8-316030 | 11/1996 |
| JP | 2530268 | 12/1996 |
| JP | 9-27416 | 1/1997 |
| JP | 9-27426 | 1/1997 |
| JP | 10-223432 | 8/1998 |
| JP | 2928898 | 5/1999 |
| JP | 2000-36409 | 2/2000 |
| JP | 2000-083338 | 3/2000 |
| JP | 2000-277327 | 10/2000 |
| JP | 2001-148309 | 5/2001 |
| JP | 2001-263141 | 9/2001 |
| JP | 2002-222710 | 8/2002 |
| JP | 2002-299118 | 10/2002 |
| JP | 2002-307104 | 10/2002 |
| JP | 3390746 | 1/2003 |
| JP | 2003-074731 | 3/2003 |
| JP | 2003-106471 | 4/2003 |
| JP | 2005-207461 | 8/2005 |

OTHER PUBLICATIONS

Japanese Office Action for Application No. 2004-082443, dated Oct. 9, 2007.
Japanese Office Action for Application No. 2004-094066, dated Sep. 11, 2007.
Japanese Office Action for Application No. 2004-082443, dated Apr. 15, 2008.
Japanese Office Action for Application No. 2004-100955, dated Apr. 15, 2008.
Japanese Office Action for Application No. 2004-100977, dated Apr. 15, 2008.
Japanese Office Action for Application No. 2004-100955, dated Jul. 1, 2008.
Japanese Office Action for Application No. 2004-012762, dated Apr. 1, 2008.
Japanese Office Action for Application No. 2004-082443, dated Dec. 16, 2008.

* cited by examiner

LINEAR SOLENOID VALVE

BACKGROUND OF THE INVENTION

1. Field of the Invention

The present invention relates to a linear solenoid valve for generating an electromagnetic force in proportion to an amount of current supplied to a solenoid, for displacing a valve element under the generated electromagnetic force.

2. Description of the Related Art

There have been used in the art electromagnetic valves for displacing a valve element by attracting a movable core to a fixed core under an electromagnetic force that is generated when a solenoid coil is energized.

The applicant of the present application has proposed an electromagnetic apparatus as such an electromagnetic valve, including a movable core that is accurately responsive to a generated magnetic force.

SUMMARY OF THE INVENTION

It is a general object of the present invention to provide a linear solenoid valve which is capable of increasing attractive forces acting on a movable core by positioning an outer circumferential surface of an annular boss of the movable core and a bottom wall surface of a housing in partially overlapping relation to each other, while also positioning the annular boss of the movable core and a protruding support of the housing in an appropriate layout.

A major object of the present invention is to provide a linear solenoid valve which can be reduced in size by positioning an outer circumferential surface of an annular boss of the movable core and a bottom wall surface of a housing in partially overlapping relation to each other, while also positioning the annular boss of the movable core and a protruding support of the housing in an appropriate layout.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
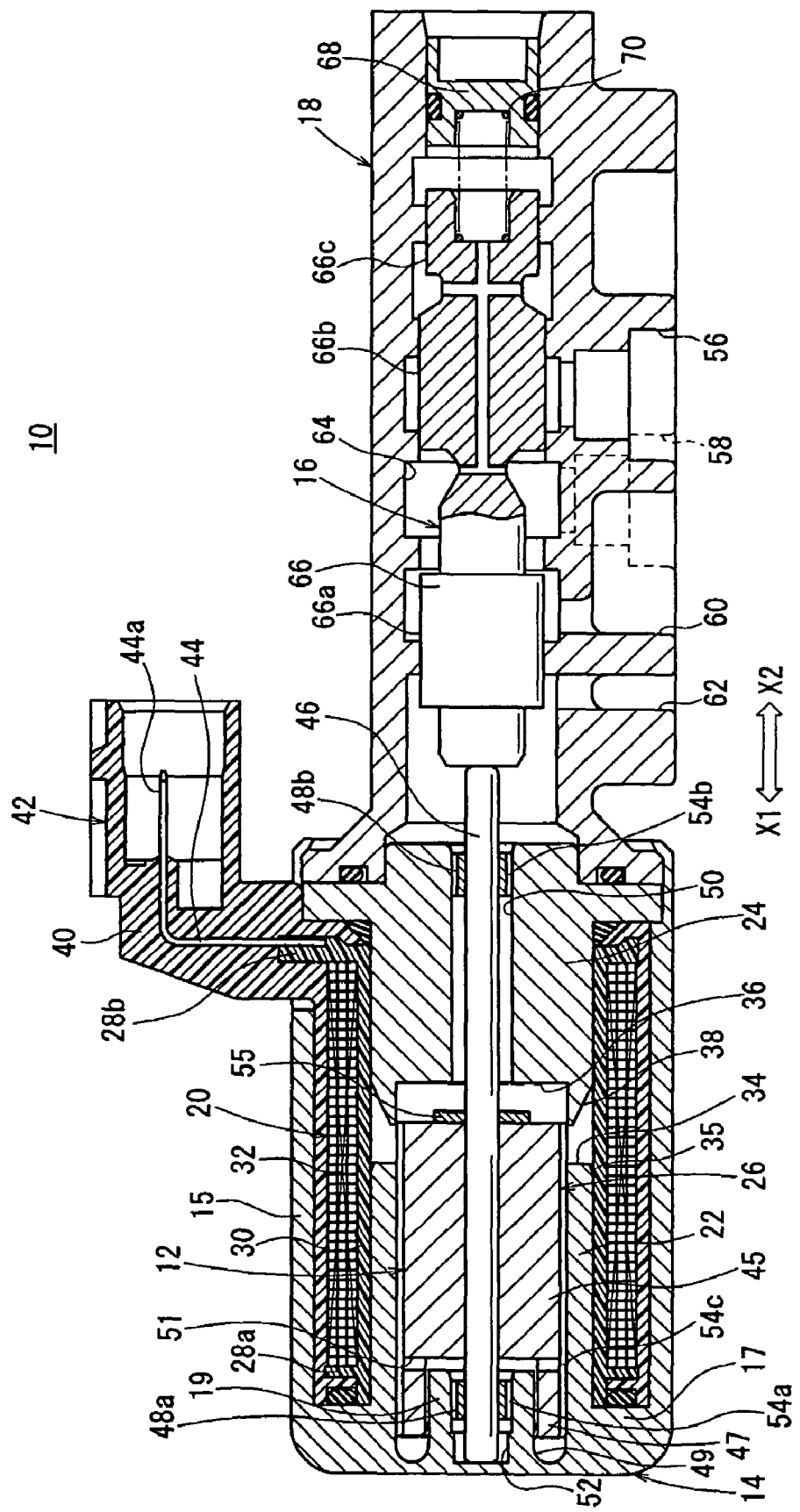
FIG. 1 is a longitudinal cross-sectional view of a hydraulic control valve according to an embodiment of the present invention, taken along an axial direction thereof.

FIG. 1 shows in longitudinal cross section a hydraulic control valve 10 according to an embodiment of the present invention.

As shown in FIG. 1, the hydraulic control valve 10 comprises a housing 14 with a solenoid (linear solenoid) 12 disposed therein and a valve body 18 integrally coupled to the housing 14 and accommodating a valve mechanism 16 therein. The housing 14 and the valve body 18 jointly function as a valve casing. The housing 14 is in the form of a bottomed hollow cylinder made of a magnetic material such as SUM (JIS) or the like.

The housing 14 comprises a hollow cylindrical member 15, a tubular yoke 22 disposed in and spaced radially inwardly a predetermined distance from the hollow cylindrical member 15 such that the yoke 22 extends substantially parallel to the hollow cylindrical member 15, and a bottom 17, which is thicker than the hollow cylindrical member 15, joining the left ends of the hollow cylindrical member 15 and the yoke 22. The hollow cylindrical member 15, the yoke 22, and the bottom 17 are formed integrally with each other.

The tubular yoke 22 may be replaced with a substantially tubular yoke, which is separate from the housing 14 and press-fitted in a press-fitting hole defined by an inner circumferential surface of the bottom 17 of the housing 14.

The bottom 17 has a protruding support 19 disposed on an inner wall thereof and comprising an annular boss, which extends substantially parallel to the tubular yoke 22 while supporting a movable core (described later). The protruding support 19 has a hole 52 defined centrally therein for receiving an end of a shaft 46 (described later).

The solenoid 12 includes a coil assembly 20 disposed in the housing 14, the tubular yoke 22 which is formed integrally with the housing 14 at the closed end thereof and disposed in the coil assembly 20, a fixed core 24 joined to an open end of the housing 14 and axially spaced a predetermined clearance from the yoke 22 within the coil assembly 20, and a movable core 26 slidably fitted within the yoke 22 and the fixed core 24.

Figure 3:
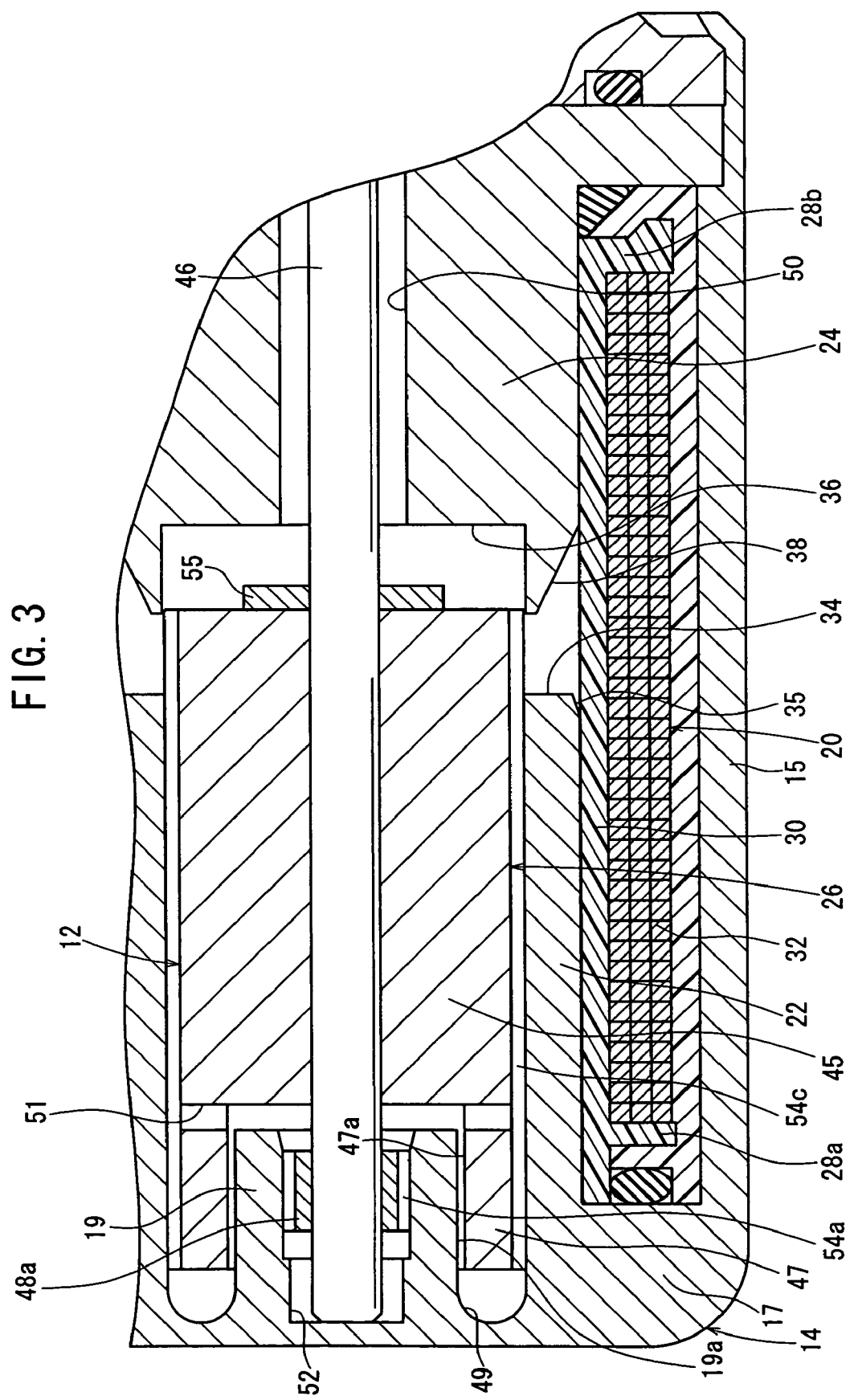
FIG. 3 is an enlarged fragmentary longitudinal cross-sectional view of a coil assembly of the hydraulic control valve.
Figure 4:
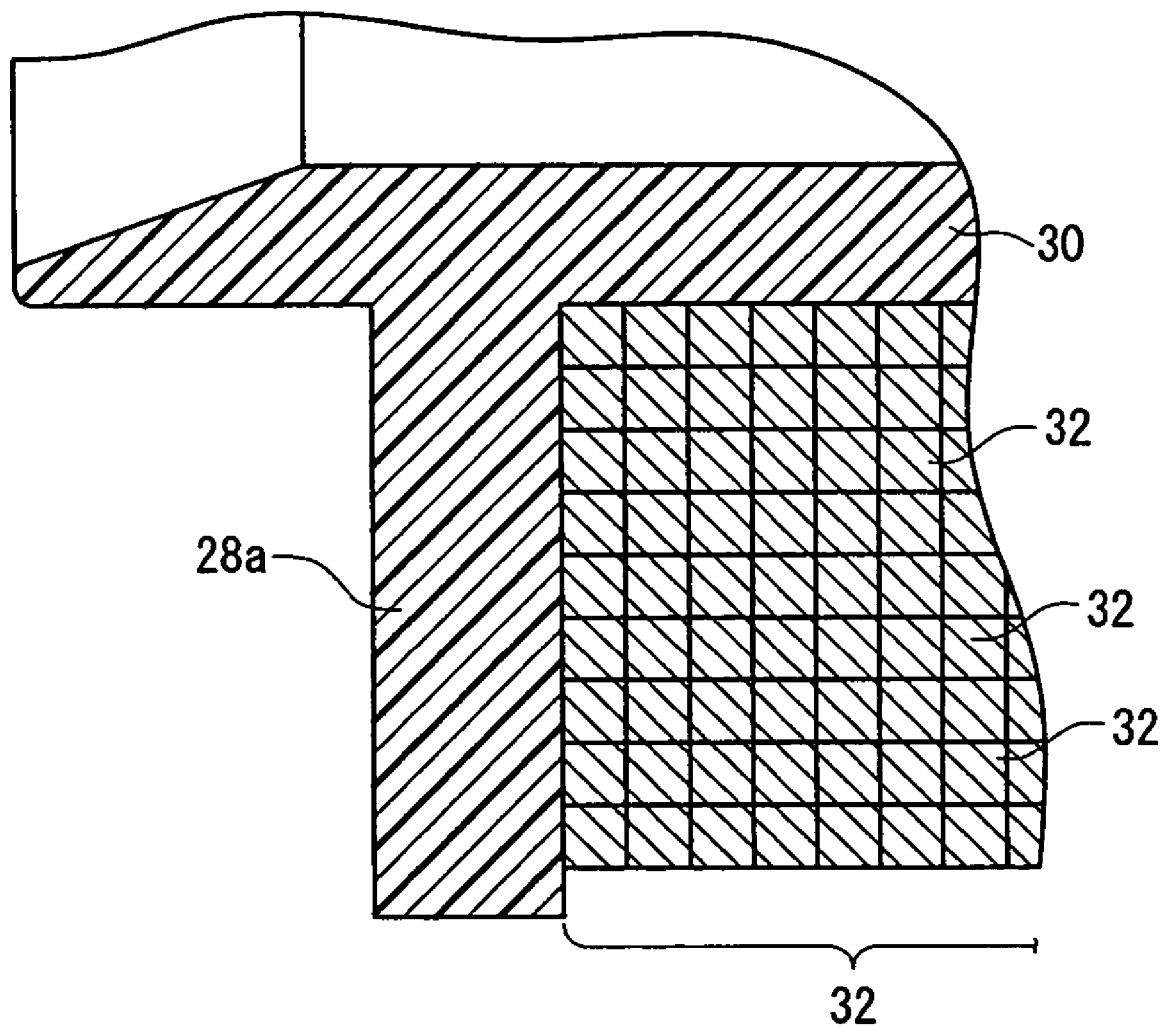
FIG. 4 is an enlarged fragmentary longitudinal cross-sectional view of a coil formed with a wire having a square cross section, which is wound around a coil bobbin.

The coil assembly 20 comprises a coil bobbin 30 made of a plastic material and having flanges 28a, 28b, wherein the flanges 28a, 28b are disposed on respective axially spaced ends thereof, and a coil 32 having a plurality of turns wound around the coil bobbin 30 and comprising a conductive wire having a square cross section, as shown in FIGS. 3 and 4.

Figure 5:
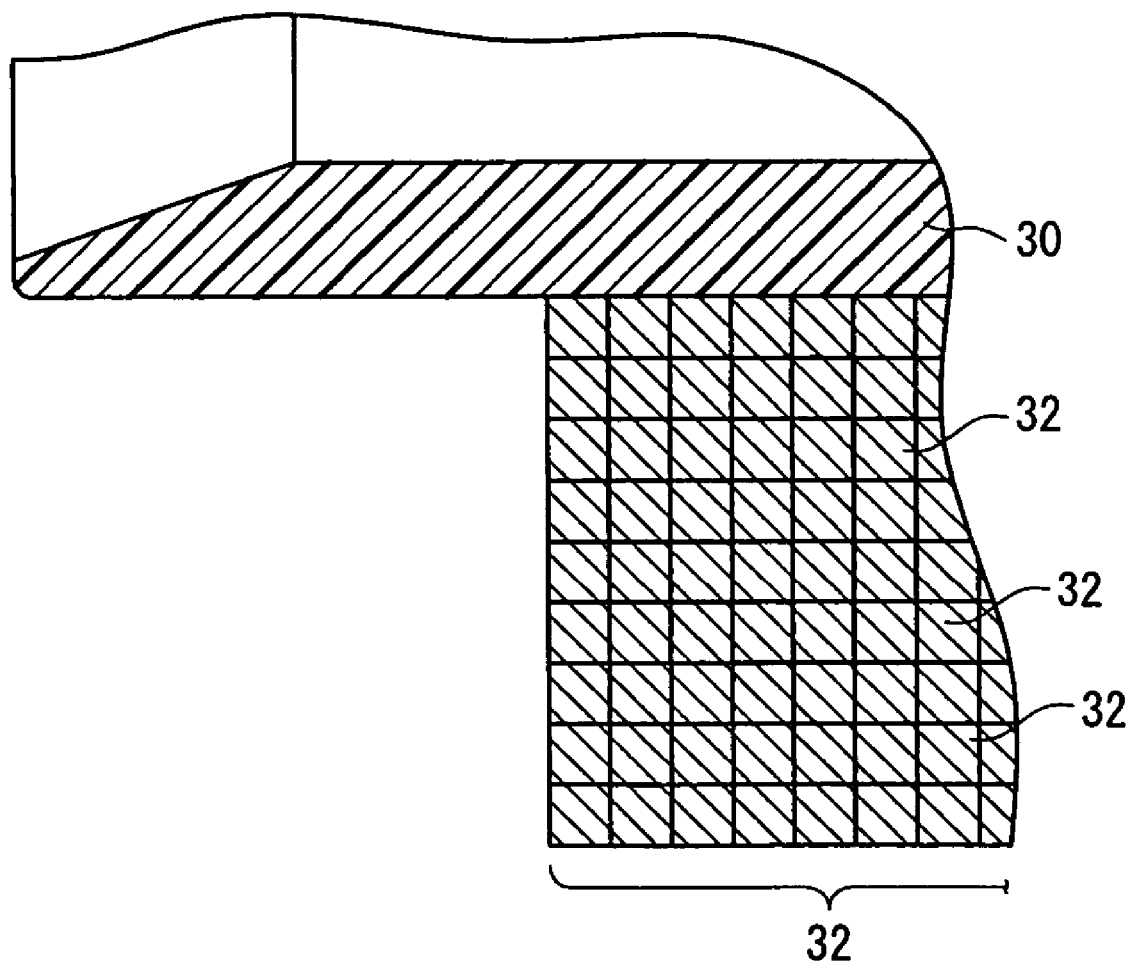
FIG. 5 is an enlarged fragmentary longitudinal cross-sectional view of a coil, which is wound around a coil bobbin that is free of a flange.

The turns of the coil 32, which have a square cross section and which are wound around the coil bobbin 30, are held in surface-to-surface contact with each other. Therefore, the turns of the coil 32 are stably arrayed in desired positions. Since the turns of the coil 32 are thus stably arrayed, one of the flanges 28a or 28b may be dispensed with as shown in FIG. 5. If one of the flanges 28a or 28b is dispensed with, the axial dimension of the solenoid 12 is reduced, so as to make the solenoid 12 smaller in size.

Figure 13:
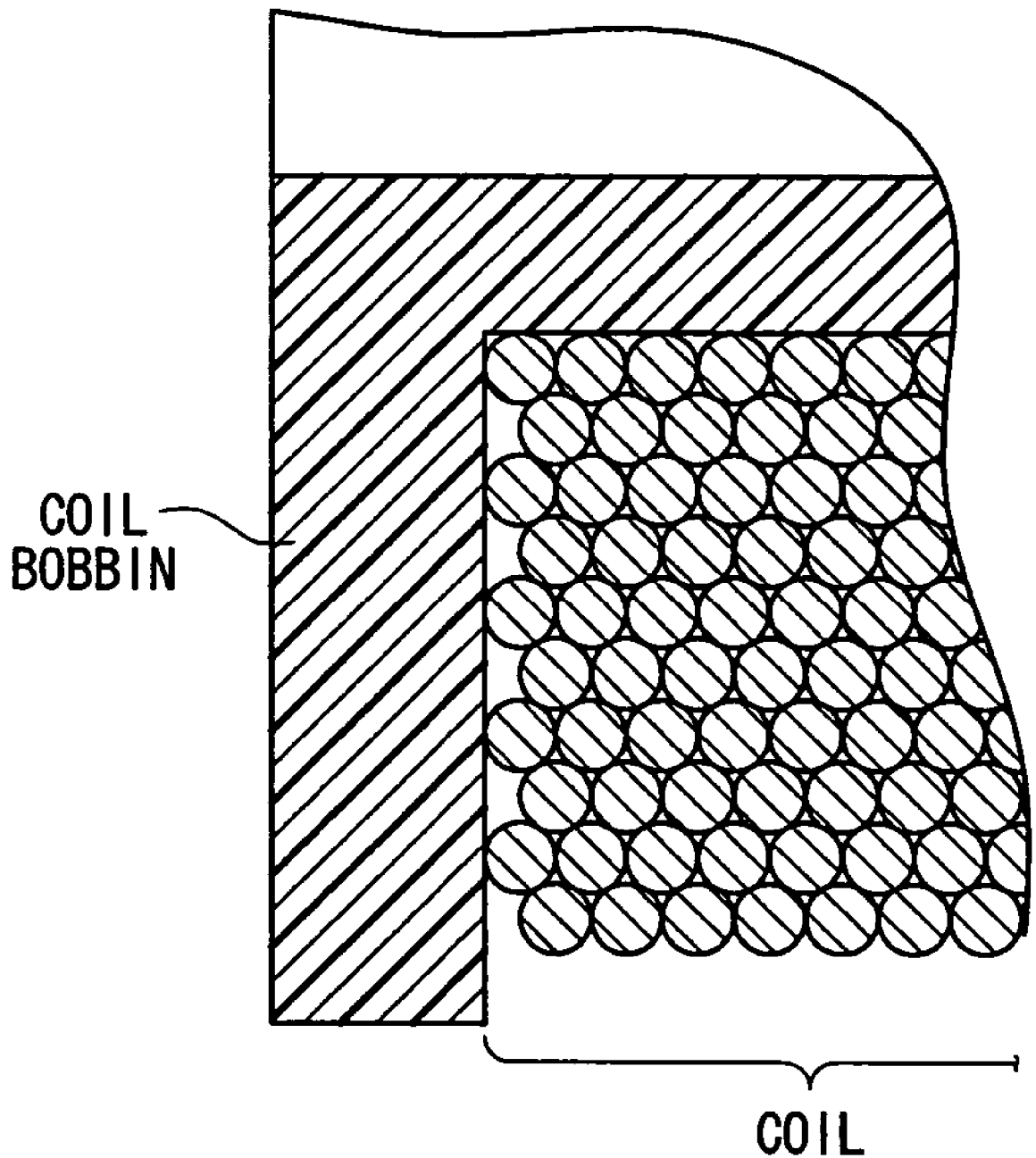
FIG. 13 is an enlarged fragmentary longitudinal cross-sectional view of a conventional coil wound around a coil bobbin.

If a conventional coil comprising a conductive wire having a circular cross section were wound around a coil bobbin, as shown in FIG. 13, then the coil would be subject to forces tending to cause the coil to collapse toward the flange under the tension of the wound coil. The coil 32 having a square cross section, according to the present embodiment, has turns that are held in surface-to-surface contact with each other, and thus is not susceptible to forces tending to cause the coil 32 to collapse toward the flange 28a, 28b.Consequently, one of the flanges 28a or 28b, as shown in FIG. 13, may be dispensed with.

Figure 6:
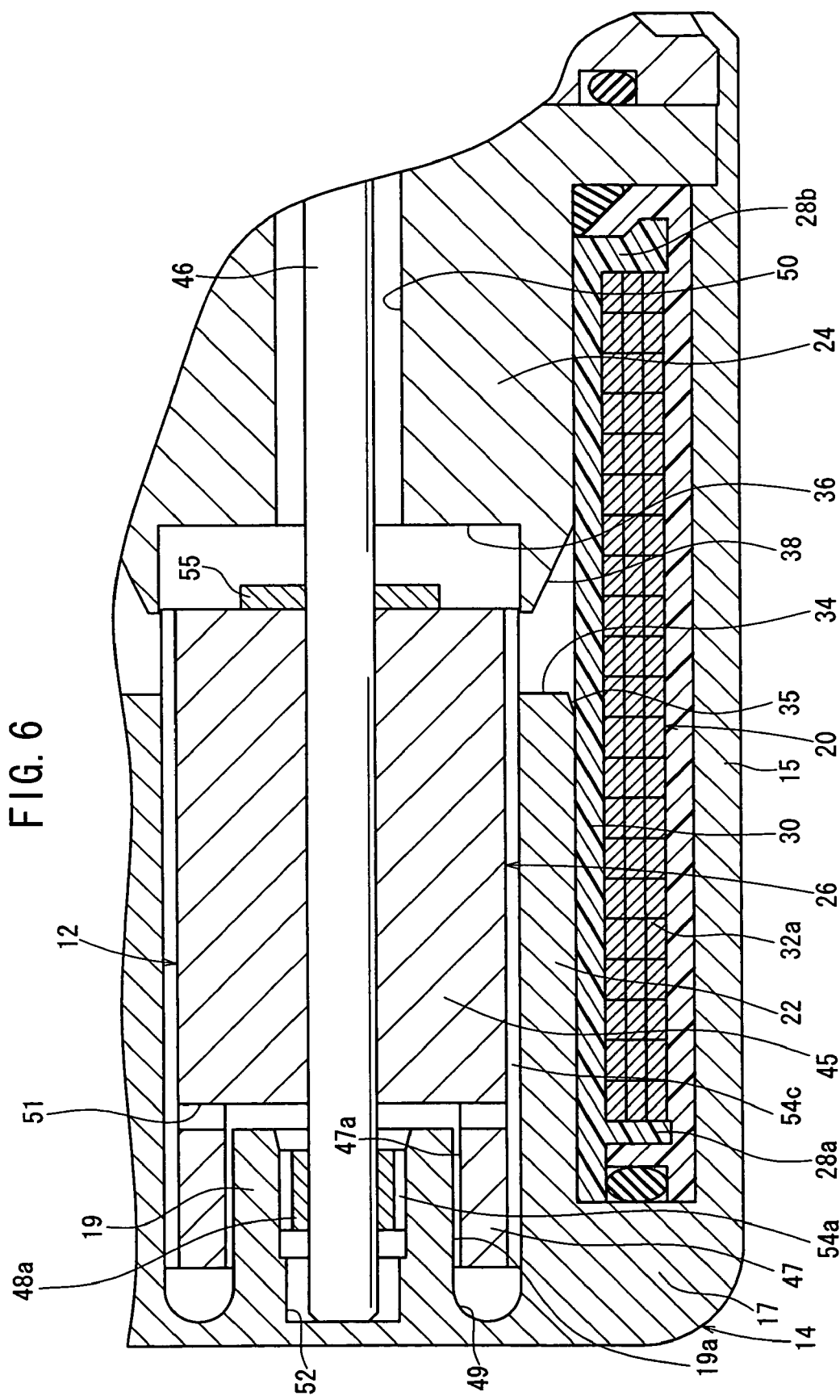
FIG. 6 is an enlarged fragmentary longitudinal cross-sectional view of a modification of the coil assembly shown in FIG. 3.
Figure 7:
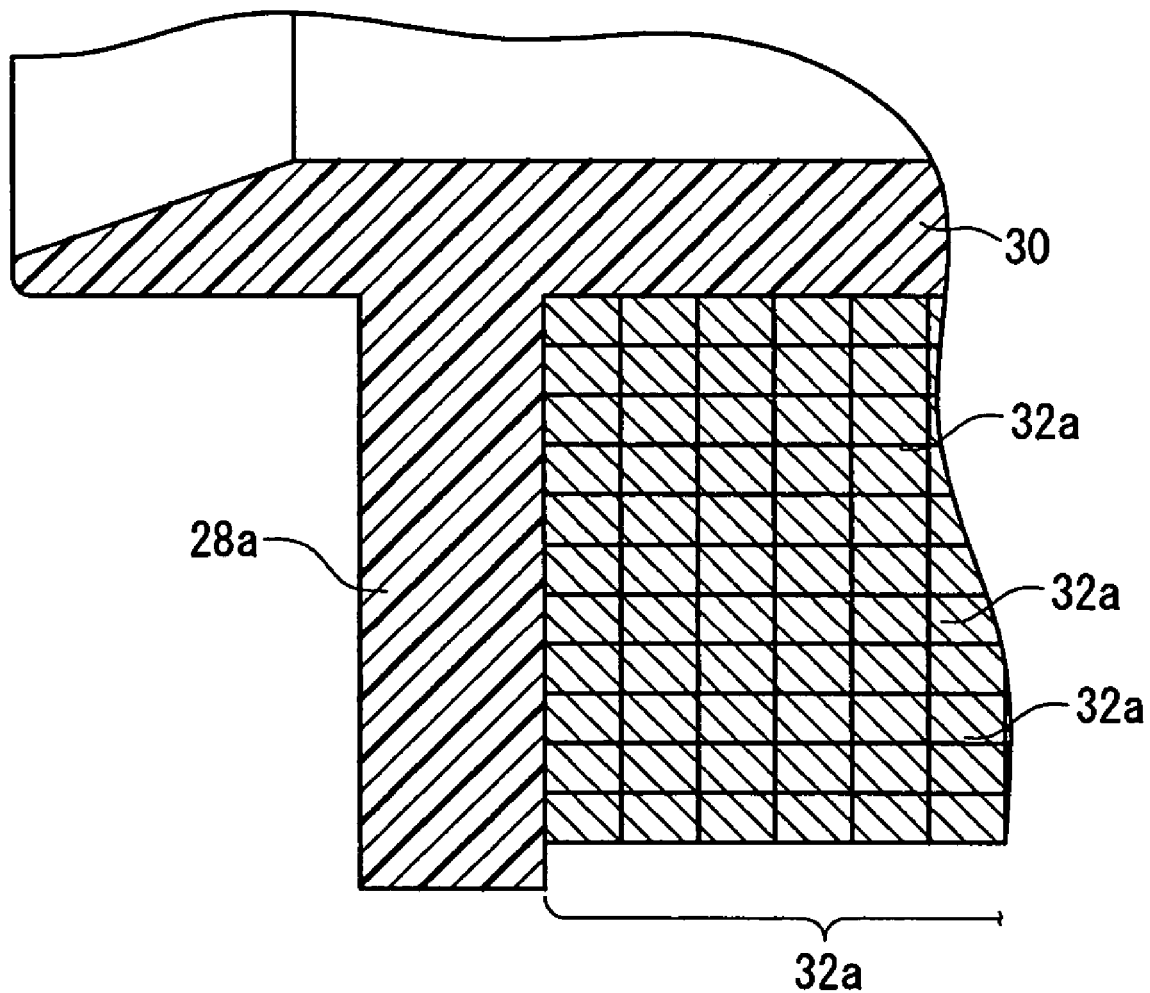
FIG. 7 is an enlarged fragmentary longitudinal cross-sectional view of a coil formed with a wire having an elongate rectangular cross section, which is wound around a coil bobbin.

As shown in FIGS. 6 and 7, the solenoid 12 may have a coil 32a comprising a flat conductive wire having an elongate rectangular cross section. However, the coil 32 having a square cross section can be wound in a smaller space than the coil 32a having an elongate rectangular cross section. Furthermore, since the coil 32 having a square cross section has a smaller cross-sectional circumferential dimension than the coil 32a having an elongate rectangular cross section, the cross-sectional area of an insulating film disposed on the coil 32 may be set to a smaller value.

As shown in FIG. 3, the yoke 22 has an annular flat surface 34 on the right end thereof, which faces the fixed core 24, and the fixed core 24 has an annular conical surface 38 on the left end thereof, which faces the yoke 22. The annular conical surface 38 extends on the outer circumferential surface of the fixed core 24 around a cavity 36 defined in the fixed core 24. The yoke 22 also has a tapered surface 35 formed on an end face thereof adjacent to the annular flat surface 34, thus providing a circumferentially beveled surface for reducing flux leakage.

The tubular member forming the yoke 22 and the cavity 36 defined in the fixed core 24 are complementary in shape to the movable core 26, thereby providing a linear solenoid structure in which the movable core 26 is slidable between the tubular yoke 22 and the cavity 36 defined in the fixed core 24.

Figure 2:
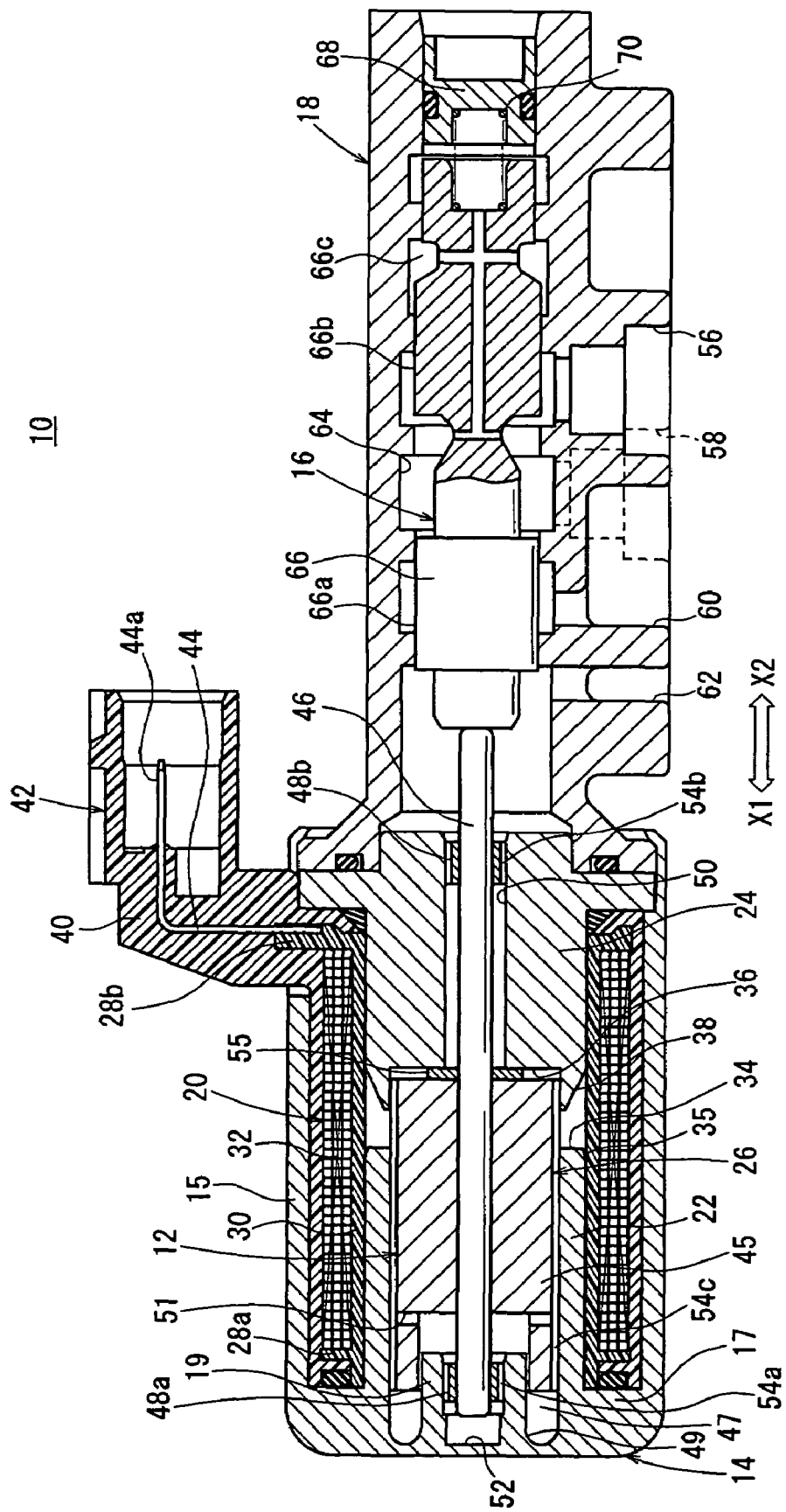
FIG. 2 is a longitudinal cross-sectional view of the hydraulic control valve, showing a spool valve displaced when a solenoid of the hydraulic control valve shown in FIG. 1 is energized.

As shown in FIGS. 1 and 2, a synthetic resin sealing body 40, which is molded over the outer circumferential surface of the coil 32 and a portion of the coil bobbin 30, is disposed between the housing 14 and the coil 32. The synthetic resin sealing body 40 is molded from a synthetic resin material, and is formed integrally with a coupler 42. The coupler 42 has a terminal 44, which is electrically connected to the coil 32, and has an exposed terminal end 44a that is electrically connected to a power supply (not shown).

The outer circumferential surface of the coil 32 is covered with the synthetic resin sealing body 40 for being stably protected. If one of the flanges 28a (28b) on the ends of the coil bobbin 30 is dispensed with, then the portion of the coil bobbin 30 that lacks the flange 28a (28b) is also covered with the synthetic resin sealing body 40, for protecting the coil 32 more stably.

As shown in FIG. 3, the movable core 26 comprises a cylindrical movable core body 45 and an annular boss 47 formed integrally with an end of the movable core body 45 and projecting a predetermined distance toward the bottom 17 of the housing 14. The annular boss 47 is disposed in an annular space 49 defined between the tubular yoke 22, the inner wall surface of the bottom 17, and the protruding support 19.

A circumferential uniform clearance is defined between the inner circumferential surface 47a of the annular boss 47 and the outer circumferential surface 19a of the protruding support 19. In FIG. 3, an inner circumferential surface 47a of the annular boss 47 and an outer circumferential surface 19a of the protruding support 19 lie substantially parallel to each other with a clearance interposed therebetween.

The movable core 26 includes a pressurized oil passage (pressurized fluid passage) 51 defined in the boundary between the movable core body 45 and the annular boss 47, and extending in a direction perpendicular to the axis of the shaft 46, i.e., defined diametrically through the boundary between the movable core body 45 and the annular boss 47. The pressurized oil passage 51 functions as an oil breather hole when the annular boss 47 enters into the annular space 49. The pressurized oil passage 51 may be formed as a single passage or a crisscrossing passage.

The shaft 46 extends centrally axially through and is fixed to the movable core 26. The shaft 46 has an end axially slidably supported by a first plain bearing (first bearing) 48a, which is mounted in the hole 52 in the protruding support 19, and another end axially slidably supported by a second plain bearing (second bearing) 48b, which is mounted in a through hole 50 defined centrally axially through the fixed core 24.

The movable core 26 has axially opposite ends deformed radially inwardly and crimped onto the shaft 46, and hence the movable core 26 is integrally joined to the shaft 46. The movable core 26 and the shaft 46 need not be separate from each other, but may be formed integrally with each other.

Since the axially opposite ends of the shaft 46 extending axially through the movable core 26 are slidably supported respectively by the first and second bearings 48a, 48b, the movable core 26 is supported on a dual-end support structure provided by the shaft 46. The dual-end support structure provided by the shaft 46 allows the movable core 26 to move stably in the axial linear direction.

The first plain bearing 48a is press-fitted securely in the hole 52 in the protruding support 19, and has first communication grooves 54a defined in an outer circumferential surface thereof and communicating between opposite ends thereof (see FIGS. 1 and 3). The second plain bearing 48b is press-fitted securely in the through hole 50, and has second communication grooves 54b defined in an outer circumferential surface and communicating between opposite ends thereof (see FIG. 1). The movable core 26 has third communication grooves 54c defined in an outer circumferential surface thereof and communicating between opposite ends thereof (see FIGS. 1 and 3).

A ring 55 is mounted on an end face of the movable core 26, which faces the fixed core 24 and is fitted over the shaft 46. The ring 55 is made of a nonmagnetic material and functions as a spacer for preventing residual magnetism from being produced in the solenoid 12.

Specifically, when the solenoid 12 is deenergized, residual magnetism may be produced in the fixed core 24 or the movable core 26, tending to keep the movable core 26 attracted to the fixed core 24. However, the nonmagnetic ring 55, which is mounted on the end face of the movable core 26 and fitted over the shaft 46, forms a certain clearance between the movable core 26 and the fixed core 24, thereby preventing residual magnetism from being produced.

The movable core 26 may be made of a ferrite-base stainless steel, such as SUS410L, SUS405 (JIS), or the like, a general steel such as S10C (JIS) or the like, or a free-cutting steel such as SUM (JIS) or the like.

The magnetic material that makes up the movable core 26 may contain 12 weight % or less of Cr for increased durability.

As shown in FIGS. 1 and 2, the valve mechanism 16 is made up of the valve body 18, including an inlet port 56, an outlet port 58, a drain port 60, and a breather port 62 communicating with an oil tank (not shown), defined in a side wall thereof, and a spool valve (valve element) 66, which is axially displaceably disposed in a space 64 defined in the valve body 18.

The spool valve 66 has a first land 66*a*, a second land 66*b*, and a third land 66*c*, which are positioned successively from the solenoid 12. The first land 66*a* and the second land 66*b* are of the same diameter, and the third land 66*c* is slightly smaller in diameter than the first land 66*a* and the second land 66*b*.

The space 64 in the valve body 18 is closed by an end block 68 that is disposed in the end of the valve body 18 remote from the solenoid 12. A return spring 70 for normally pressing the spool valve 66 toward the solenoid 12 is disposed between the end block 68 and the spool valve 66. The return spring 70 is illustrated as being a helical spring. However, the return spring 70 is not limited to a helical spring, but may be another resilient member such as a leaf spring or the like.

The spool valve 66 has an end face positioned closely to the solenoid 12 and held in abutting engagement with the end of the shaft 46. The spring force of the return spring 70 acts through the spool valve 66 and the shaft 46 on the movable core 26, pressing the movable core 26 axially in the direction indicated by the arrow X1 in FIG. 1.

The hydraulic control valve 10 according to the present embodiment is basically constructed as described above. Operations and advantages of the hydraulic control valve 10 will be described below.

When the solenoid 12 is deenergized, the spool valve 66 is pressed axially in the direction indicated by the arrow X1 in FIG. 1 under the spring force (pressing force) of the return spring 70, holding the inlet port 56 and the outlet port 58 out of communication with each other.

Figure 8:
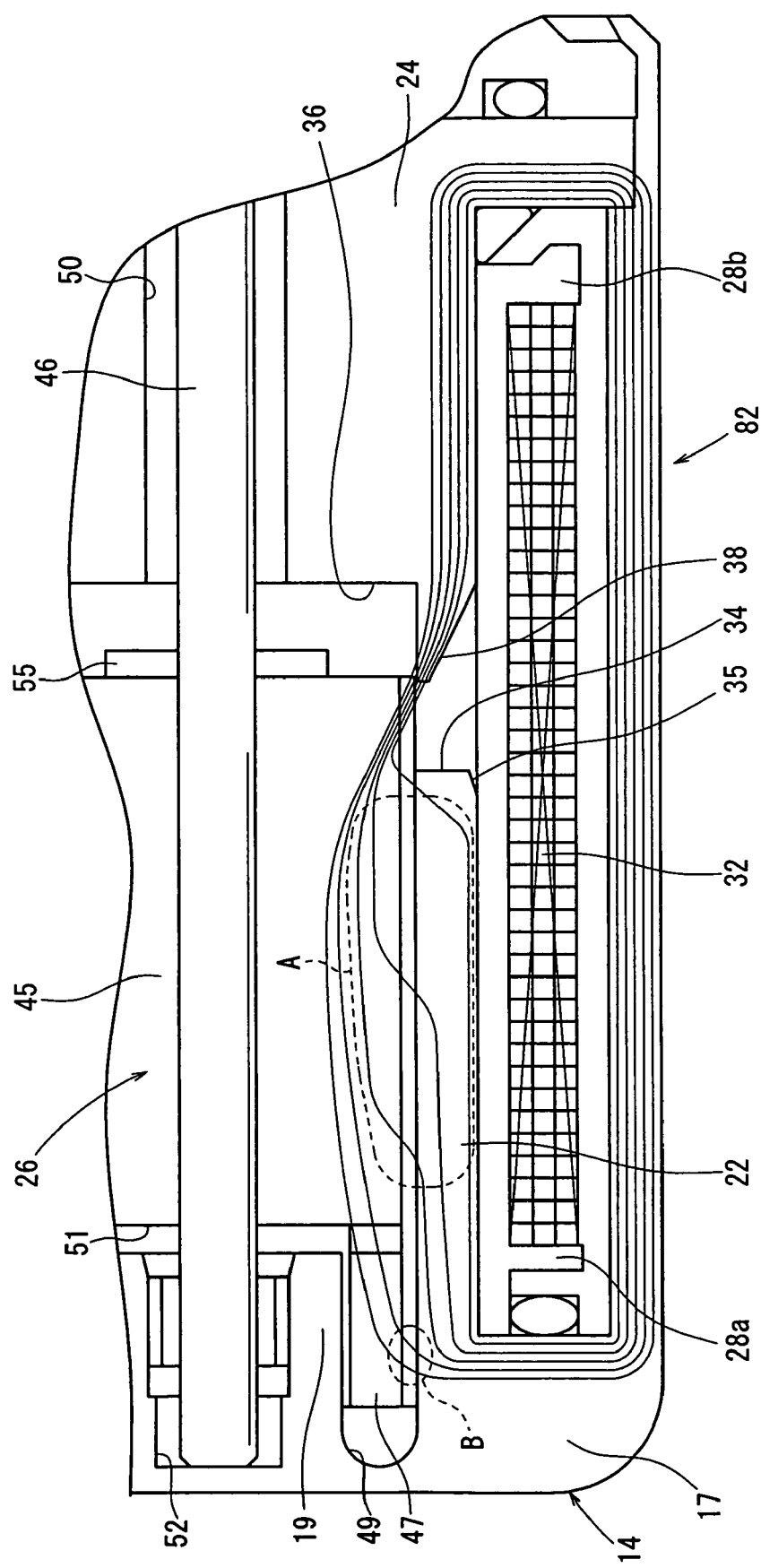
FIG. 8 is an enlarged fragmentary view showing a magnetic circuit of a solenoid.

When the non-illustrated power supply is turned on, the coil 32 of the solenoid 12 is energized, causing a magnetic circuit 82 to generate an electromagnetic force, as shown in FIG. 8. At this time, the generated electromagnetic force is proportional to the amount of current supplied to the coil 32, and is applied to the movable core 26. Under the generated electromagnetic force, the shaft 46 and hence the spool valve 66 are axially displaced in the direction indicated by the arrow X2 in FIG. 1 against the bias of the return spring 70. The drain port 60 and the outlet port 58 are brought out of communication with each other, and the inlet port 56 and the outlet port 58 are brought into communication with each other (see FIG. 2).

Oil, which is supplied under pressure from an oil source (not shown) through a passageway (not shown), flows through the inlet port 56 and the outlet port 58 and is supplied to a hydraulic device (not shown). When the solenoid 12 is deenergized, the spool valve 66 returns to the initial position shown in FIG. 1 under the bias of the return spring 70.

In the present embodiment, the protruding support 19 comprises an annular boss which is disposed on the bottom 17 of the housing 14, wherein the annular boss 47 disposed on the end face of the movable core 26 faces the bottom 17 and enters into the annular space 49 that is defined between the yoke 22, the bottom 17, and the protruding support 19. Therefore, magnetic fluxes that run from the bottom 17 of the housing 14 toward the movable core 26 are also transferred between the inner wall surface of the bottom 17 and the outer circumferential surface of the annular boss 47 of the movable core 26. Thus, magnetic fluxes are smoothly transferred between the bottom 17 of the housing 14 and the annular boss 47 of the movable core 26, so that an increased amount of magnetic fluxes can be generated by the magnetic circuit.

Specifically, magnetic fluxes generated when the coil 32 is energized include, as shown in FIG. 8, magnetic fluxes (A in FIG. 8) which flow from the inner circumferential surface of the tubular yoke 22, through the bottom 17 of the housing 14, and to a circumferential side surface of the movable core 26, and magnetic fluxes (B in FIG. 8) which flow from a portion of the inner circumferential surface of the tubular yoke 22 which corresponds to the bottom 17, through the bottom 17, and to the annular boss 47 of the movable core 26.

In the magnetic circuit of a conventional electromagnetic valve, when magnetic fluxes flow through the bottom 17 to the movable core 26, the magnetic fluxes flow from the inner circumferential surface of the tubular yoke 22 into the tubular yoke 22, and thereafter correspond only to the flow A from the yoke 22 to the movable core 26. According to the present embodiment, on the other hand, magnetic fluxes flow as both the flow A, from the yoke 22 to the movable core 26, and also as the flow B, from the portion of the inner circumferential surface of the tubular yoke 22 which corresponds to the bottom 17, to the movable core 26, i.e., the annular boss 47 thereof. Therefore, the generated magnetic fluxes flow highly smoothly, and the amount of overall magnetic flux flowing through the magnetic circuit 82 is increased (as a result of the flow A of magnetic fluxes together with the flow B of magnetic fluxes).

As a result, the solenoid 12 can produce increased attractive forces or, if the solenoid 12 is made to produce the same attractive forces as a conventional solenoid, then the hydraulic control valve 10 can be reduced in overall size.

With the annular boss 47 being disposed in the annular space 49, the protruding support 19 is disposed in the annular boss 47 of the movable core 26. The space in the end of the movable core 26 facing the bottom 17 of the housing 14 is thus effectively utilized. Therefore, the housing 14 has a flat outer bottom surface and may be reduced in size, unlike a housing having a protruding support projecting outwardly from the outer bottom surface thereof. The annular boss 47 disposed in the annular space 49 is also effective to increase attractive forces on the movable core 26 and to reduce the size of the housing 14.

As shown in FIG. 3, the inner circumferential surface 47*a* of the annular boss 47 and the outer circumferential surface 19*a* of the protruding support 19 lie substantially parallel to each other, thereby minimizing the clearance between the inner circumferential surface 47*a* and the outer circumferential surface 19*a*. Thus, the annular boss 47 may be increased in thickness within the annular space 49, and may be positioned while effectively utilizing the annular space 49.

In the present embodiment, furthermore, the coil 32 wound around the coil bobbin 30 of the solenoid 12 is of a square cross section, thereby minimizing any gaps between stacked turns of the coil 32. Therefore, the total cross-sectional area of the coil 32, i.e., the overall space occupied by the coil 32 wound around the coil bobbin 30, is smaller than that of a conventional solenoid coil having a circular cross section and the same number of turns as the coil 32.

Stated otherwise, the ratio of the cross-sectional area of the conductor of the coil 32 to the space in which the coil 32 is wound, i.e., the conductor occupation ratio, may be greater than that produced by a solenoid coil having a circular cross section. Since the space in which the coil 32 is wound can be reduced, the coil bobbin 30 can also be reduced in size, resulting in a reduction in the overall size of the solenoid 12.

Alternatively, if the space in which the coil 32 is wound is the same as the space in which a solenoid coil having a circular cross section is wound, then if the coil 32 has a square cross section, the number of turns of the coil 32 on the coil bobbin 30 is greater than the number of turns possible when using a solenoid coil having a circular cross section. Accordingly, the solenoid 12 can produce greater attractive forces (electromagnetic forces) than are possible when using the solenoid coil having a circular cross section.

In the present embodiment, since the space in which the coil 32 is wound can be reduced, the total dimension (i.e., total length) of the continuous wire of the coil 32 can be reduced, and hence the resistance of the coil 32 can also be reduced. As a result, the electric power consumed when the coil 32 is energized can be reduced.

Alternatively, if the coil 32 having a square cross section has the same resistance as a solenoid coil having a circular cross section, then the number of turns of the coil 32 wound around the coil bobbin 30 can be increased, according to the present embodiment, for producing increased attractive forces (electromagnetic forces).

In the present embodiment, inasmuch as the turns of the coil 32 having a square cross section are held in surface-to-surface contact with each other, the conductor occupation ratio, within the space in which the coil 32 is wound, is greater than the conductor occupation ratio obtainable when using a coil having a circular cross section that is wound within a similar space.

Consequently, any gaps between stacked turns of the coil 32 can be minimized, thereby increasing the density of turns of the coil 32 per unit volume within the space in which the coil 32 is wound. As a result, the heat transfer capability (heat radiation capability) within the space in which the coil 32 is wound is also increased. If the present invention is applied to an electromagnetic valve used in an environment where the atmospheric temperature is lower than the temperature to which the coil is heated, then since the heat radiation capability can be increased while the resistance of the coil 32 is reduced, the amount of heat generated by the coil 32 when it is energized is reduced. Therefore, the resistance of the coil 32 can further be reduced.

The solenoid 12, including the coil having a square cross section, can be used as an electromagnetic valve for use in vehicles. Generally, there is a minimum battery voltage of 8V, for example, which is applied to the electric parts used in vehicles. Since electromagnetic valves for use in vehicles are required to maintain a minimum magnetomotive force (current value), the maximum resistance that such electromagnetic valves should have is necessarily determined if the same magnetic circuit is employed. Because the resistance of the coil 32 generally increases as the temperature thereof increases, the maximum resistance has to be of a value that takes into account this temperature-dependent resistance increase. If the maximum resistance is set without taking into account such a temperature-dependent resistance increase, then the electromagnetic valve may not operate under the required current and possibly may not obtain the required minimum magnetomotive force. Therefore, if the solenoid 12 is used as an electromagnetic valve for use in vehicles, then it is required to maintain a prescribed magnetomotive force (current value), even though the resistance of the coil 32 may be increased due to an increase in the temperature of the coil 32 when the solenoid 12 is energized.

It is highly advantageous if both the resistance of the coil 32 itself, and the resistance of the coil 32 when it is heated upon energization, are kept low, because the coil 32 can maintain a high current value according to Ohm's law. When the coil 32 is of a square cross section, since the solenoid 12 can produce the same magnetomotive force as conventional solenoids, the resistance of the coil 32 is made smaller and the coil 32 consumes a lower amount of electric power, thus reducing the amount of heat generated by the coil 32 when it is energized, and resulting in a reduction in the resistance of the coil 32 during times when it is energized and heated.

As a result, the resistance of the coil 32 during times when it is energized and heated can be reduced to allow an increased current to pass through the coil 32. Therefore, the solenoid 12 can appropriately be used in an electromagnetic valve, for which the minimum applied voltage thereto is limited. Furthermore, since the current value of the solenoid 12 having a coil 32 with a square cross section is made higher than that of a conventional solenoid having a coil with a circular cross section, while producing the same magnetomotive force, the number of turns of the coil 32 around the coil bobbin 30 can be made smaller, and hence the coil 32 is made smaller in size.

Figure 9:
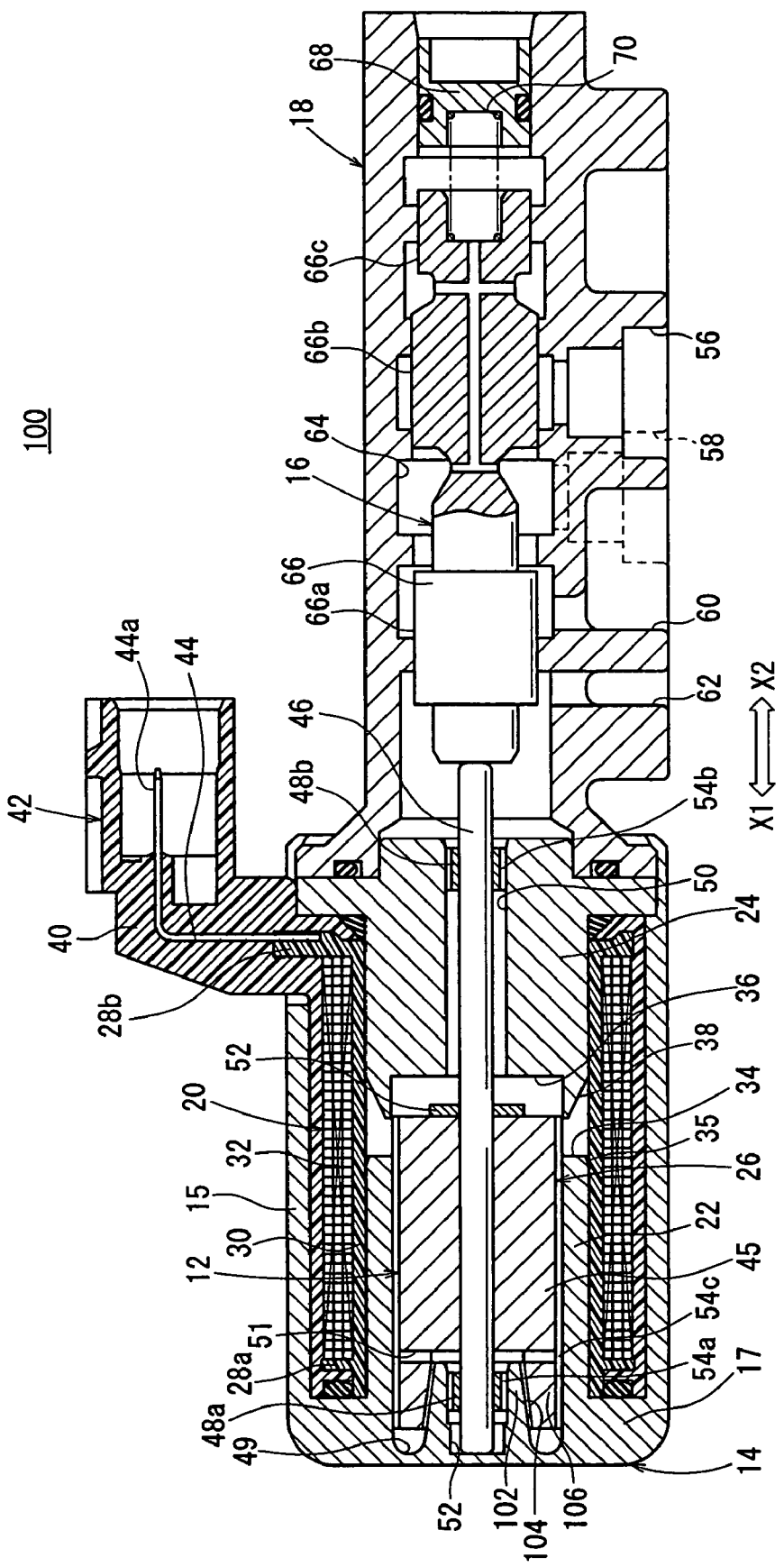
FIG. 9 is a longitudinal cross-sectional view of a hydraulic control valve according to another embodiment of the present invention, taken along an axial direction thereof.
Figure 10:
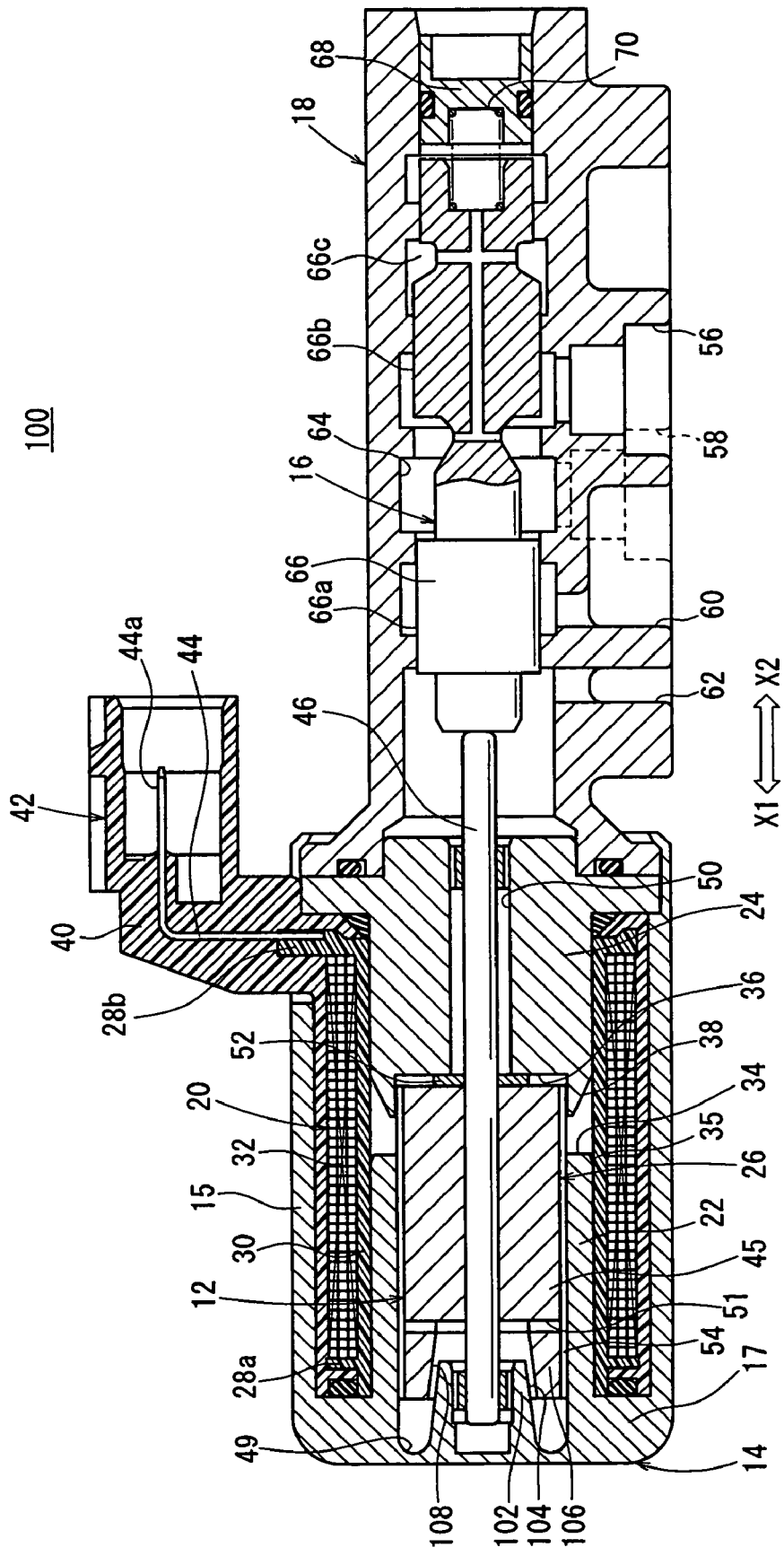
FIG. 10 is a longitudinal cross-sectional view of the hydraulic control valve, showing a spool valve displaced when a solenoid of the hydraulic control valve shown in FIG. 9 is energized.
Figure 11:
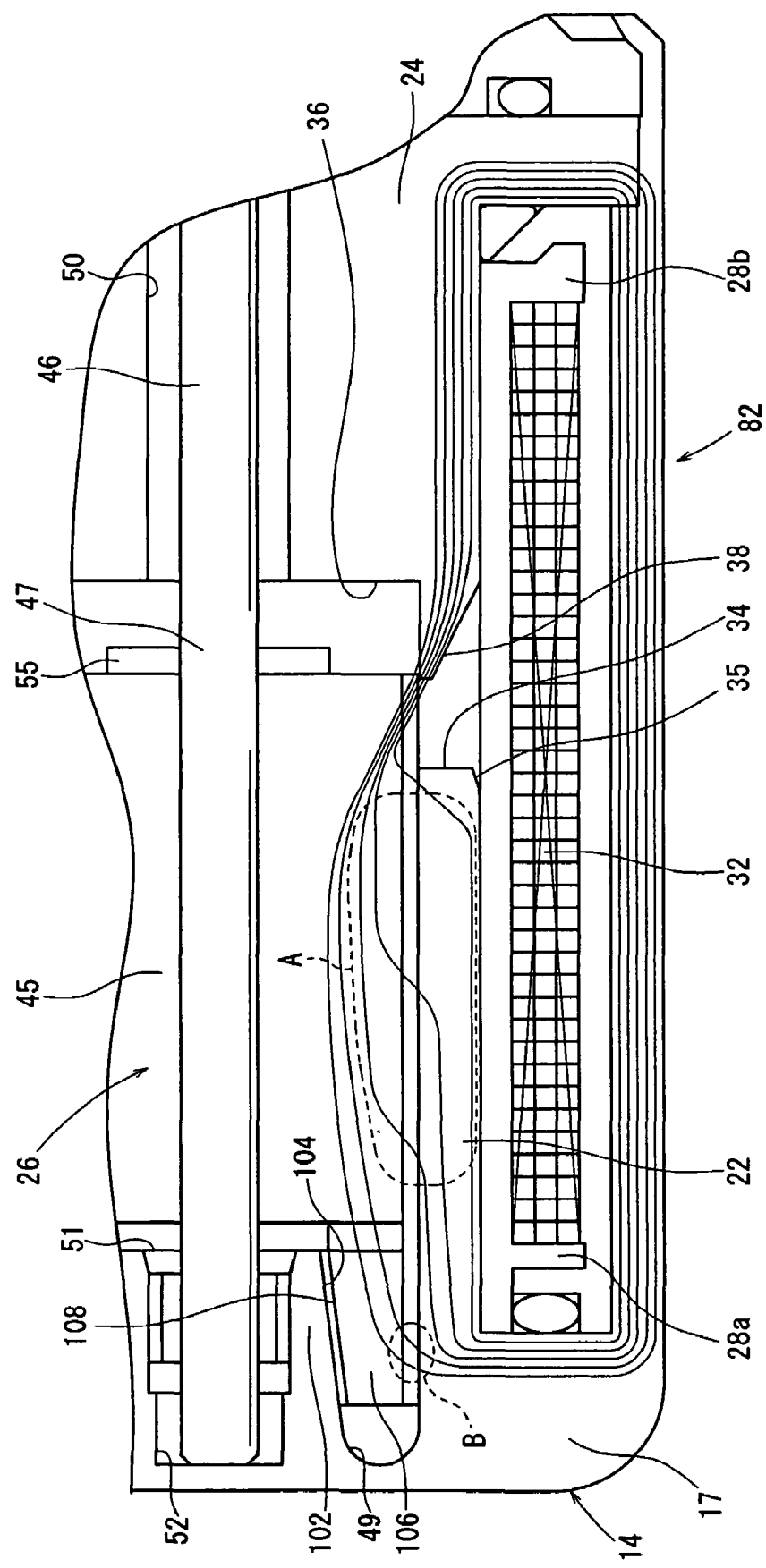
FIG. 11 is an enlarged fragmentary view showing a magnetic circuit of a solenoid.

A hydraulic control valve 100 according to another embodiment of the present invention is shown in FIGS. 9 through 11. Those parts of the hydraulic control valve 100 which are identical to the hydraulic control valve 10 according to the embodiment shown in FIGS. 1 and 2 are denoted by identical reference characters, and will not be described in detail below.

The hydraulic control valve 100 according to the present embodiment differs from the hydraulic control valve 10 according to the preceding embodiment in that the hydraulic control valve 100 includes a protruding support 102 disposed on the bottom 17 of the housing 14, wherein the protruding support 102 has an outer circumferential surface constructed as a tapered surface 104 whose diameter is progressively smaller toward the movable core 26. Further, an annular boss 106 is disposed on the movable core 26 and has an inner circumferential surface constructed as an inversely tapered surface 108, which faces the tapered surface 104 of the protruding support 102 across a predetermined clearance, and being complementary in shape to the tapered surface 104 (see FIG. 11).

Specifically, while in the preceding embodiment the inner circumferential surface 47a of the annular boss 47 and the outer circumferential surface 19a of the protruding support 19 lie substantially parallel to each other in the hydraulic control valve 10, according to the present embodiment, an inner circumferential surface of the annular boss 106 and an outer circumferential surface of the protruding support 102 of the hydraulic control valve 100 are constructed respectively as a tapered surface 104 and an inversely tapered surface 108, which are slanted at a given angle with respect to the axis of the shaft 46.

Since the outer circumferential surface of the protruding support 102 is constructed as a tapered surface 104, whose diameter is progressively smaller toward the movable core 26, and further since the inner circumferential surface of the annular boss 106 is constructed as an inversely tapered surface.108, which is complementary in shape to the tapered surface 104, the movable core 26 is subject to more favorable hydraulic forces when it is moved.

Specifically, when the solenoid 12 is energized to move the movable core 26 toward the fixed core 24, the tapered surface 104 and the inversely tapered surface 108 are displaced relatively away from each other. Therefore, oil shearing forces are reduced, and the movable core 26 moves smoothly when it is attracted to the fixed core 24.

In the above illustrated embodiments, the inner circumferential surface 47a of the annular boss 47 and the outer circumferential surface 19a of the protruding support 19 lie substantially parallel to each other, and the outer circumferential surface of the protruding support 102 and the inner circumferential surface of the annular boss 106 are constructed as a tapered surface and an inversely tapered surface respectively. However, the outer circumferential surface of the protruding support 102 may be constructed as a tapered surface, and the inner circumferential surface of the annular boss 106 may extend parallel to the axis of the shaft 46, for example. In addition, alternatively, the tapered surface 104 of the protruding support 102 and the inversely tapered surface 108 of the annular boss 106 may be slanted at different angles, respectively, such that they are disposed in a crossed configuration.

The tapered surface 104 of the protruding support 102 has a diameter that is progressively smaller toward the movable core 26, i.e., progressively greater toward a proximal end thereof at the end of the housing 14. Accordingly, the protruding support 102 has increased mechanical strength. Furthermore, since the protruding support 102 is slanted at a draft angle toward the open end of the housing 14, the housing 14 can easily be manufactured by forging.

Other structural features and advantageous effects are the same as those of the preceding embodiments, and will not be described in detail.

Figure 12:
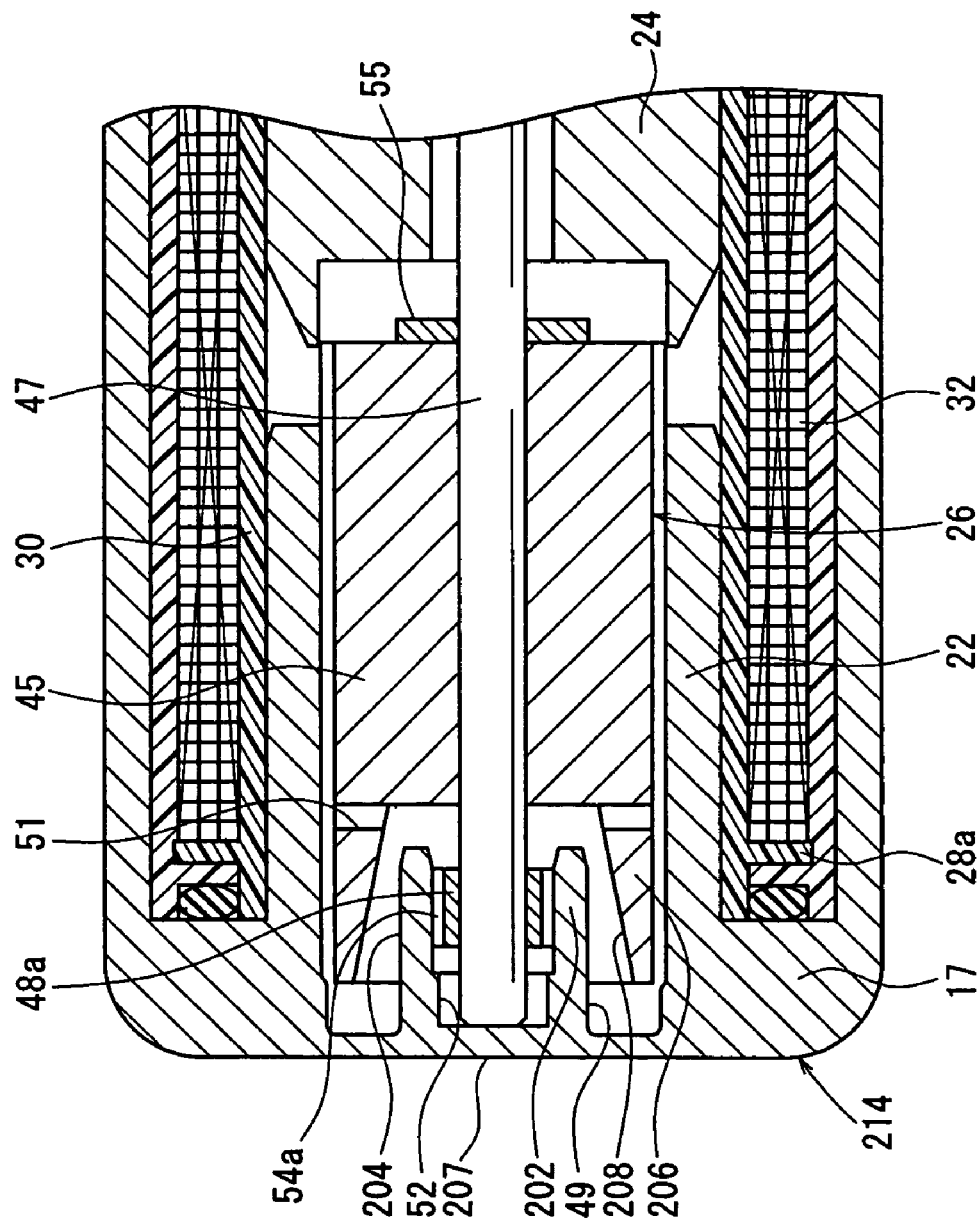
FIG. 12 is enlarged fragmentary longitudinal cross-sectional view of a hydraulic control valve according to still another embodiment of the present invention, taken along an axial direction thereof.

A hydraulic control valve 200 according to still another embodiment of the present invention is shown in FIG. 12. Those parts of the hydraulic control valve 200 which are identical to the hydraulic control valves 10, 100 according to the preceding embodiments are denoted by identical reference characters, and will not be described in detail below.

The hydraulic control valve 200 according to the present embodiment differs from the hydraulic control valves 10, 100 according to the preceding embodiments in that the hydraulic control valve 200 includes a protruding support 202 disposed on the bottom 17 of the housing 214, wherein the protruding support 202 has an outer circumferential surface constructed as a cylindrical surface 204 whose diameter is constant. Further, an annular boss 206 is disposed on the movable core 26 and has an inner circumferential surface constructed as a tapered surface 208 whose diameter is progressively larger toward an end 207 of a housing 214. The tapered surface 208 faces the cylindrical surface 204 of the protruding support 202 with a predetermined clearance.

Specifically, the hydraulic control valve 200 according to the present embodiment differs from the hydraulic control valves 10, 100 according to the preceding embodiments in that an outer circumferential surface of the protruding support 202 is constructed as the cylindrical surface 204 lying substantially parallel to the axis of the shaft 46 in the hydraulic control valve 200. Further, an inner circumferential surface of the annular boss 206 is constructed as the tapered surface 208 which is slanted at a given angle with respect to the axis of the shaft 46.

Since the outer circumferential surface of the protruding support 202 is constructed as the cylindrical surface 204, and further since the inner circumferential surface of the annular boss 206 is constructed as the tapered surface 208, the movable core 26 is subject to more favorable hydraulic forces when it is moved. When the solenoid 12 is energized to move the movable core 26 toward the fixed core 24, the cylindrical surface 204 and the tapered surface 208 are displaced relatively away from each other. Therefore, oil shearing forces are reduced, and the movable core 26 moves smoothly when it is attracted to the fixed core 24.

The annular boss 206 has the tapered surface 208 such that the thickness thereof is progressively increased toward the center of the coil 32 where magnetic fluxes flow easily. Further, the gap or distance between the tapered surface 208 and the cylindrical surface 204 is large near the end 207 of the housing 214. Thus, it is possible to make magnetic fluxes flow highly effectively by reducing flux leakage.

Further, when the housing 214 is integrally molded by forging to provide the protruding support 202 with the cylindrical surface 204, loads of a forging die (not shown) can be reduced. Thus, service life of the forging die can be prolonged.

Other structural features and advantageous effects are the same as those of the embodiments mentioned previously, and will not be described in detail.

Although certain preferred embodiments of the present invention have been shown and described in detail, it should be understood that various changes and modifications may be made therein without departing from the scope of the appended claims.

What is claimed is:

1. A linear solenoid valve for generating an electromagnetic force in proportion to an amount of current supplied to a solenoid and displacing a valve element under the generated electromagnetic force, comprising:

a valve casing including a valve body having an inlet port and an outlet port for passage of a fluid under pressure therethrough, and a housing joined to said valve body;

a solenoid mounted in said housing and having a coil wound around a coil bobbin, a fixed core, a movable core that is attracted to said fixed core when said coil is energized, and a tubular yoke surrounding said movable core;

a valve mechanism mounted in said valve body and having a valve element responsive to displacement of said movable core, for selectively bringing said inlet port and said outlet port into and out of fluid communication with each other, wherein said housing includes a bottom having a protruding support extending a predetermined distance toward said movable core, and said movable core has an annular boss extending a predetermined distance toward the bottom of said housing, wherein a circumferential surface of said annular boss of said movable core and a wall surface of the bottom of said housing are positioned in partially overlapping relation to each other, wherein said annular boss is disposed in an annular space defined by said tubular yoke, the bottom of said housing and said protruding support of said housing, wherein the annular space extends past an end surface of the coil bobbin adjacent to the wall surface of the bottom of the housing, wherein the annular boss of the moveable core is moveable within the annular space and past the end surface of the coil bobbin adjacent to the wall surface of the bottom of the housing, and wherein said movable core comprises a shaft that extends axially through said movable core and displaces in unison with said movable core, an end of said shaft protruding from said movable core by a predetermined length toward the bottom of said housing inside said annular boss, said end being inserted in a hole defined in said protruding support.

2. A linear solenoid valve according to claim 1, wherein said annular boss has an inner circumferential surface and said protruding support has an outer circumferential surface, said inner circumferential surface and said outer circumferential surface lying substantially parallel to each other with a clearance interposed therebetween.

3. A linear solenoid valve according to claim 1, wherein said protruding support has an outer circumferential surface constructed as a tapered surface having a diameter progressively smaller toward said movable core, and said annular boss has an inner circumferential surface constructed as an inversely tapered surface which is complementary to said tapered surface.

4. A linear solenoid valve according to claim 1, wherein said protruding support has an outer circumferential surface constructed as a cylindrical surface having a constant diameter, and said annular boss has an inner circumferential surface constructed as a tapered surface having a diameter progressively larger toward an end of said housing.

5. A linear solenoid valve according to claim 1, wherein said movable core has a pressurized fluid passage defined diametrically therethrough.

6. A linear solenoid valve according to claim 1, wherein said end of said shaft is slidably supported by a first bearing disposed in said hole defined in said protruding support and an opposite end of said shaft is slidably supported by a second bearing mounted in said fixed core.

7. A linear solenoid valve according to claim 6, wherein said first bearing has a first axial communication passage defined in an outer circumferential surface thereof and communicating between opposite ends thereof.

8. A linear solenoid valve according to claim 6, wherein said second bearing has a second axial communication passage defined in an outer circumferential surface thereof and communicating between opposite ends thereof.

9. A linear solenoid valve according to claim 1, wherein said movable core has an axial communication passage defined in an outer circumferential surface and communicating between opposite ends thereof.

10. A linear solenoid valve according to claim 1, wherein said coil comprises a wire having a square cross section.

11. A linear solenoid valve according to claim 1, wherein said coil comprises a wire having an elongate rectangular cross section.

12. A linear solenoid valve according to claim 1, wherein said solenoid further includes a ring formed of a nonmagnetic material, which is disposed on an end face of said movable core that faces said fixed core.

13. A linear solenoid valve according to claim 1, wherein said yoke has an annular flat surface on an end thereof which faces said fixed core, and said fixed core has an annular conical surface on an end thereof which faces said yoke, said annular conical surface extending on an outer circumferential surface of said fixed core.

14. A linear solenoid valve according to claim 13, wherein said yoke has a tapered surface disposed circumferentially on an end face thereof adjacent to said annular flat surface.

* * * * *